United States Patent
Tsien

(10) Patent No.: US 7,406,568 B2
(45) Date of Patent: Jul. 29, 2008

(54) BUFFER ALLOCATION FOR SPLIT DATA MESSAGES

(75) Inventor: Benjamin Tsien, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 11/157,321

(22) Filed: Jun. 20, 2005

(65) Prior Publication Data

US 2006/0288171 A1    Dec. 21, 2006

(51) Int. Cl.
*G06F 12/00* (2006.01)
(52) U.S. Cl. .................. 711/136; 711/153; 711/160; 711/173
(58) Field of Classification Search ......... 711/118–146, 711/153, 160, 173
See application file for complete search history.

(56) References Cited

U.S. PATENT DOCUMENTS

| | | | | |
|---|---|---|---|---|
| 4,078,254 A | * | 3/1978 | Beausoleil et al. | 711/122 |
| 4,458,310 A | * | 7/1984 | Chang | 711/119 |
| 4,905,141 A | * | 2/1990 | Brenza | 711/129 |
| 5,025,366 A | * | 6/1991 | Baror | 711/128 |
| 5,588,136 A | * | 12/1996 | Watanabe | 711/160 |
| 6,178,481 B1 | * | 1/2001 | Krueger et al. | 711/122 |

* cited by examiner

*Primary Examiner*—Stephen Elmore
(74) *Attorney, Agent, or Firm*—Erik M. Metzger

(57) ABSTRACT

A technique to store a plurality of addresses and data to address and data buffers, respectively, in an ordered manner. More particularly, one embodiment of the invention stores a plurality of addresses to a plurality of address buffer entries and a plurality of data to a plurality of data buffer entries according to a true least-recently-used (LRU) allocation algorithm.

30 Claims, 4 Drawing Sheets

BUFFER ALLOCATION FOR SPLIT DATA MESSAGES

FIELD OF INVENTION

Generally, embodiments of the invention relate to integrated electronics and integrated electronics systems. More specifically, one embodiment of the invention relates to a technique to match a message's address and data portions sent separately across an interconnect.

BACKGROUND

In a microprocessor or other electronics device within a computer system, various logic circuits, such as processing cores, may request data from other logic circuits within or outside of the microprocessor or computer system, which may be stored, at least temporarily, within the requesting logic circuit's cache memory for the logic circuit to use. Accordingly, requesting logic circuits and other electronic devices may be referred to as "cache agents".

Cache agents may communicate with other cache agents or semiconductor devices within a computer system by transmitting messages across an interconnect, such as a point-to-point (P2P) network. Messages may include a data portion and an address portion, which identifies a target recipient of the data portion. Furthermore, the data portion and address portion of the messages may be sent by cache agents along different communication paths, or "channels". For example, within a multi-core processor (a processor having more than one logic to process instructions), cache agents may transmit data and corresponding address information within the multi-core processor along separate communication paths before the address and data combine into a single message to be transmitted to a target recipient located inside or outside of the multi-core processor.

Because data and addresses transmitted by a cache agent may traverse communication paths of different lengths and delay characteristics, there may be no guarantee that the proper address will be transmitted within a single message with the proper data to which the address corresponds. Furthermore, the problem is exacerbated as more cache agents transmit data and address information along the same two communication paths before being combined and transmitted to a target recipient.

FIG. 1, for example, illustrates an arrangement of cache agents in which the data transmitted by each cache agent traverses a data network communication path and in which the addresses transmitted by each cache agent traverse an address network communication path before being combined into a single message to be transmitted to a target recipient. The cache agents of FIG. 1 may be within a multi-core processor, for example, and the merge block may be an interface to a network of devices within a computer system interconnected by a shared bus or point-to-point interconnect.

If the proper data and corresponding addresses are not properly combined when transmitted in a message to a target recipient, the wrong target recipient may receive the data, which can result in system errors.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Figure 1:
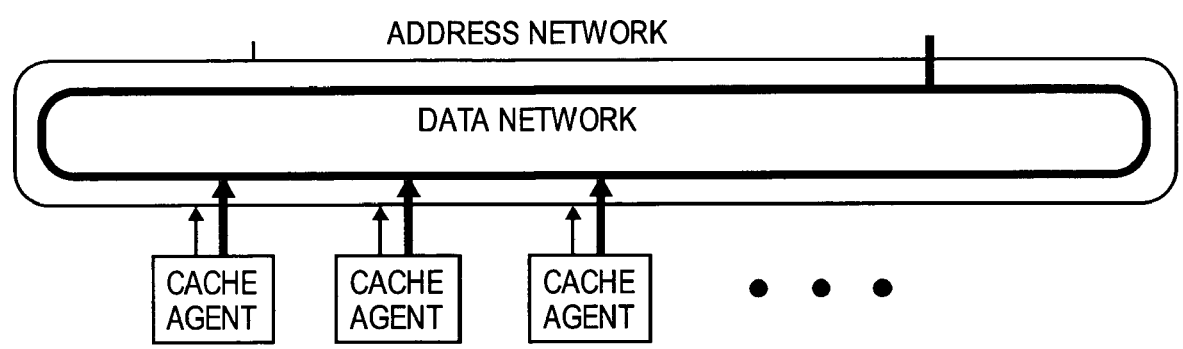
FIG. 1 illustrates a cache agent configuration in which address and data are transmitted along separate communication paths and later combined to be transmitted to a target recipient.

Embodiments of the invention disclosed herein describe an address and data matching technique that may be used in an electronic device, such as a single core or multiple core microprocessor, or an electronics system, such a shared bus computer system or a point-to-point (P2P) bus computer system. More particularly, one embodiment of the invention describes an architecture, in which data and address transmitted by a cache agent are properly combined into a message before being delivered to a target recipient indicated by the address.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In at least one embodiment of the invention, address and data information transmitted by a cache agent or cache agents along different communication paths before being combined into a message to be delivered to a target recipient device are properly paired within the message by storing the address and data within an address and data buffer, respectively, whose entries are allocated according to a true least-recently used (LRU) resource allocation technique, wherein, in at least one embodiment, address and data buffer resources may be allocated based, at least in part, upon entry resources that have been least-recently deallocated. In one embodiment, in particular, one of three entries of an address and data buffer group corresponding to a particular cache agent is to store newly received address and data information, respectively, according to a true LRU resource allocation algorithm, wherein, in at least one embodiment, a least-recently de-allocated one of the three address and data buffer group entries is allocated to the newly received address or data information, respectively. In one embodiment, each of the three entries are contained within separate buffer circuits, whereas in other embodiments, each of the three entries are contained within the same buffer circuit that has been partitioned (logically or physically) according to the number of cache agents.

Embodiments of the invention may be implemented in a variety of electronic devices and logic circuits. Furthermore, devices or circuits that include embodiments of the invention may be included within a variety of computer systems, including a point-to-point (p2p) computer system and shared bus computer systems. Embodiments of the invention may also be included in other computer system topologies and architectures.

Figure 2:
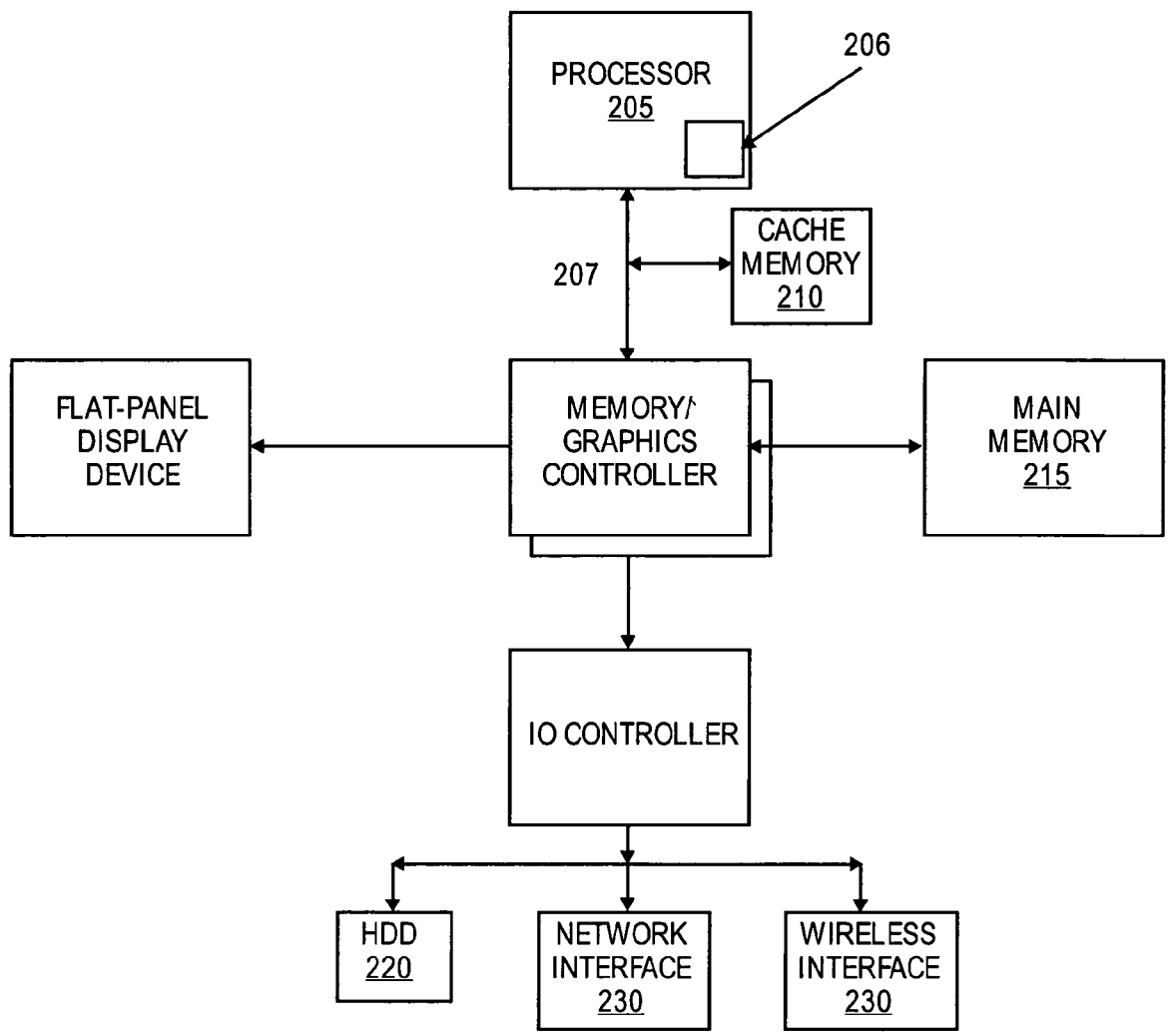
FIG. 2 illustrates a shared bus computer system in which one embodiment of the invention may be used.

FIG. 2, for example, illustrates a front-side-bus (FSB) computer system in which one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Furthermore, in some embodiments, the computer system of FIG. 2 may contain both a L1 cache and an L2 cache.

Illustrated within the processor of FIG. 2 is one embodiment of the invention 206. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207.

Furthermore, the cache memory may contain relatively fast memory cells, such as a six-transistor (6T) cell, or other memory cell of approximately equal or faster access speed. The computer system of FIG. 2 may be a point-to-point (PtP) network of bus agents, such as microprocessors, that communicate via bus signals dedicated to each agent on the PtP network. Within, or at least associated with, each bus agent may be at least one embodiment of invention 206, Alternatively, an embodiment of the invention may be located or associated with only one of the bus agents of FIG. 2, or in fewer than all of the bus agents of FIG. 2.

Figure 3:
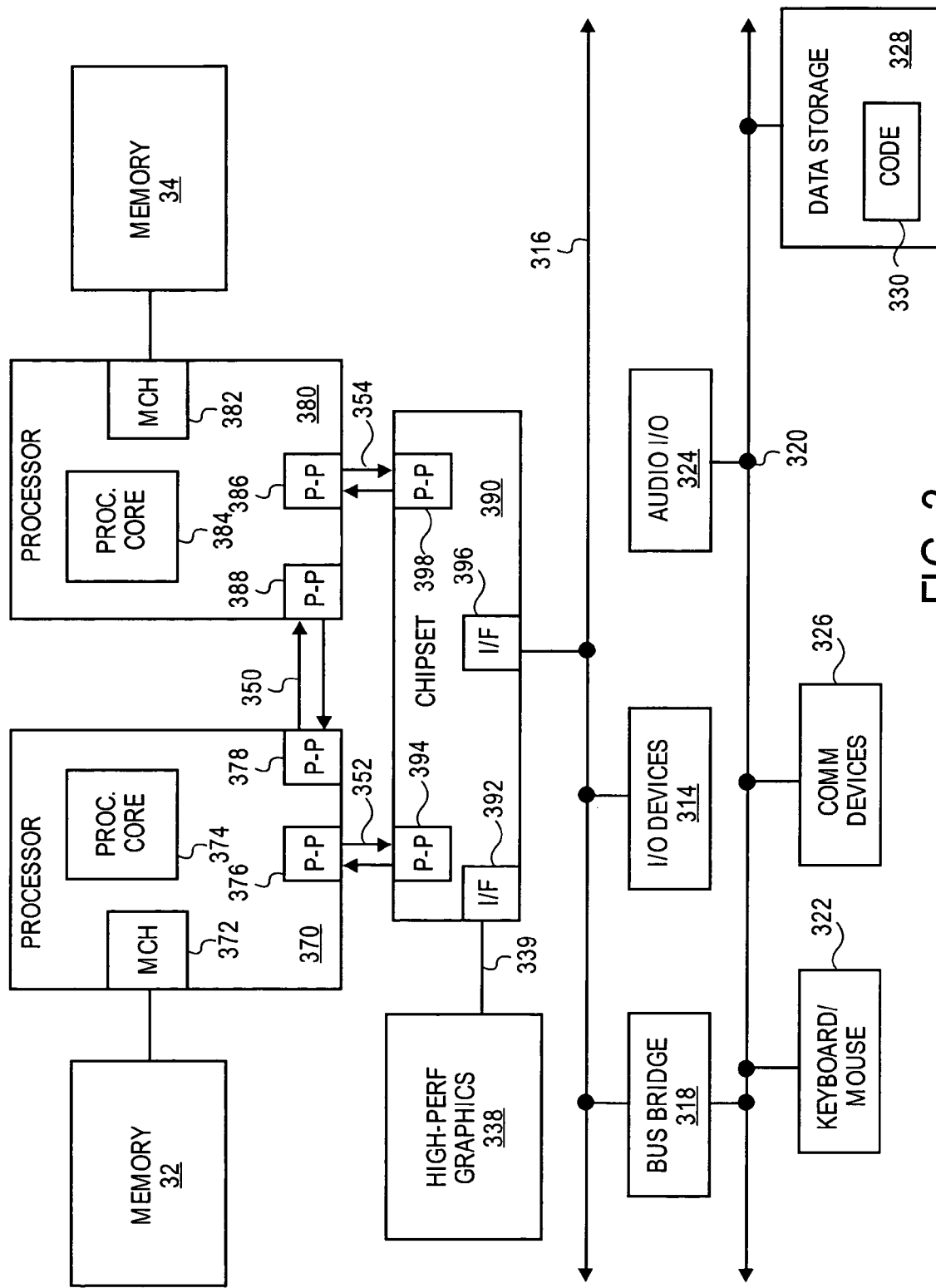
FIG. 3 illustrates a point-to-point computer system in which one embodiment of the invention may be used.

Similarly, at least one embodiment may be implemented within a point-to-point computer system. FIG. 3, for example, illustrates a computer system that is arranged in a point-to-point (PtP) configuration. In particular, FIG. 3 shows a system where processors, memory, and input/output devices are interconnected by a number of point-to-point interfaces.

The system of FIG. 3 may also include several processors, of which only two, processors 370, 380 are shown for clarity. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3.

Other embodiments of the invention, however, may exist in other circuits, logic units, or devices within the system of FIG. 3. Furthermore, in other embodiments of the invention may be distributed throughout several circuits, logic units, or devices illustrated in FIG. 3.

Figure 4:
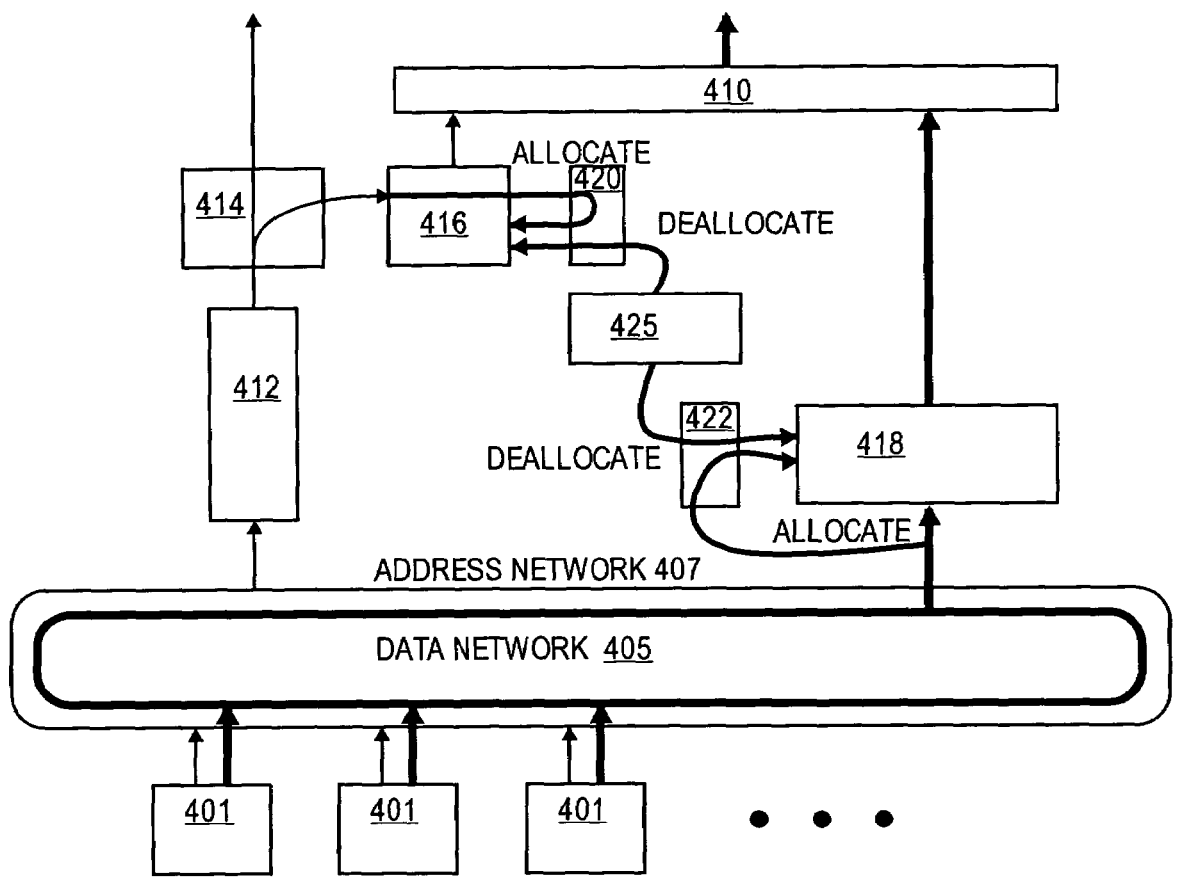
FIG. 4 illustrates an architecture and technique to match cache agent-transmitted address with appropriate cache agent-transmitted data, such that a message sent to a target recipient contains the correct address and data, according to one embodiment of the invention.

FIG. 4 illustrates an architecture, in which at least one cache agent transmits data and address information along separate networks, and in which the data and address information are then properly combined into a message to be delivered to a target recipient device, according to one embodiment of the invention. FIG. 4 contains one or more cache agents 401 connected together via a data network 405 and an address network 407, across which each cache agent may transmit data and address information, respectively.

Address and data may traverse different paths in FIG. 4 before being combined by merge logic 410 and subsequently transmitted in a message to a recipient or recipients indicated by the address portion of the message. For example, address information in FIG. 4 may enter a coherence ordered first-in-first-out (FIFO) buffer 412 from which the address information may be transmitted to dependence resolution logic 414 before being stored in address buffer 416. In other embodiments, the address information may pass through other circuits (more or fewer than in FIG. 4) before being stored in the address buffer. Data, on the other hand, may be transmitted along the data network directly to the data buffer 418. In other embodiments, the data may pass through other circuits (more or fewer than those in FIG. 4), before being stored in the data buffer. Furthermore, each cache agent may transmit address and data along the address and data networks in such a manner that multiple addresses may be in route to the address buffer concurrently and multiple data may be in route to the data buffer concurrently.

In one embodiment, the address information may be transmitted to the dependence resolution logic, which may change the order of addresses received from the address network in order to satisfy ordering dependency requirements imposed by a coherence protocol on different types of messages sharing the address network, for example. In one embodiment, the dependence resolution logic includes buffers, in which reordered addresses may be stored until a coherence protocol allows the address information to be forwarded to the address buffer. In one embodiment, address entry allocation logic 420 may allocate an address buffer entry prior to the address being forwarded to the address buffer or, in some embodiments, prior to the address being reordered within a buffer by the dependence resolution logic.

In some embodiments, the coherence ordered FIFO buffer may store other addresses than those to be merged with a corresponding data element. Furthermore, in some embodiments, addresses that may not be merged with a corresponding data element may be transmitted within the address network along with addresses that are to be merged with a corresponding data element through the coherence ordered FIFO and coherence resolution logic to a target destination without being allocated or stored within the address buffer.

In one embodiment, address and data are stored in entries of the address and data buffers, respectively, that have been allocated by address and data entry allocation logic 420 422. In other embodiments, the address and data entry allocation logic may be included within the address and data buffer circuits, respectively. In one embodiment, the address and data buffers are partitioned (logically or physically) into groups of entries, each group corresponding to a different cache agent. For example, in one embodiment, each group of entries contains three entries to be allocated to address and data coming from one of the cache agents, whereas in other embodiments, each group of entries may contain more or fewer entries than three for each cache agent.

Arbiter logic 425 may detect when address and corresponding data, which are to be combined into a message, are present within the address and data buffers, respectively, and subsequently enable the data and address to be passed to the merge logic (thereby deallocating the corresponding buffer entries), where the address and data may be combined into a message. In various embodiment, the arbiter logic may be implemented in software, hardware, or some combination thereof.

Entries within the address and data buffers may be allocated, in one embodiment of the invention, according to an algorithm, such as a least-recently-used (LRU) allocation technique, such that addresses stored in the address buffer will correspond to the proper data stored in the data buffer. For example, in one embodiment of the invention, the address allocation logic includes logic to implement a true LRU algorithm that will allocate an address received by a cache agent to the least recently deallocated entry of the entries to which the cache agent corresponds. Similarly, the data allocation logic, in one embodiment, includes logic to implement a true LRU algorithm that will allocate data received by a cache agent to the least recently deallocated entry of the entries to which the cache agent corresponds. In one embodiment, after a cache agent has been allocated three address and buffer entries, the cache agent may be prevented from sending further addresses or data to the address and data buffers by a credit-based buffer flow control mechanism, for example, until other address and data buffer entries have been deallocated and, therefore, available to store more address and data. In at least one embodiment, the LRU algorithm may be performed for each address and data buffer entry allocation by one or more logic circuits, whereas in other embodiments, the same logic may be used to perform an LRU algorithm for allocating entries in both the address and data buffers.

By allocating the least recently deallocated entries within the address and data entry groups to which a cache agent corresponds independently in each data and address buffer, one embodiment of the invention ensures the correct matching of data and addresses to be combined into a message by the merge logic and delivered to a target recipient specified by the address. In the embodiment illustrated in FIG. 4, a true LRU algorithm is used to allocate address and data buffer entries to the appropriate address and data, respectively. The particular true LRU algorithm used, may be chosen from various known LRU algorithms, including look-up tables, mathematical and/or logical formulas, truth tables, queues, etc. Furthermore, the LRU algorithms may be implemented using hardware logic, software, or some combination thereof. Although the data buffer and address buffer of FIG. 4 are implemented in different logic blocks, they may be combined in some embodiments within the same circuit.

In one embodiment, the architecture depicted in FIG. 4 is included within a multi-core processor. However, embodiments of the invention are not so limited in their application. Indeed, embodiments of the invention may be used in single-core processors or among and/or outside of other devices within a computer system.

In one embodiment, the architecture depicted in FIG. 4 may merge two messages containing information, such as an address and data to be stored in a location designated by the address, which may be transmitted from a cache agent along one or more neworks, such as an address and data network. However, in other embodiments of the invention, two or more messages containing various types of information, in addition to or instead of address and data information, may be transmitted from a cache agent or agents along any number of networks and combined into a single or otherwise fewer number of messages. For example, in one embodiment of the invention three or more messages may be matched and merged into one message by using a corresponding number of additional buffers and entry allocation logic. Furthermore, in one embodiment, the arbiter logic capabilities may be extended to detect messages being stored or otherwise allocated into any number of buffers, whose contents are to be combined into a single message or messages.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   an address buffer to store a first address in a first address buffer entry;
   a data buffer coupled to the address buffer to store a first data in a first data buffer entry;
   allocation logic to perform a true least-recently-used (LRU) buffer entry allocation algorithm to allocate either or both of the first address buffer entry and the first data buffer entry within the first address buffer and the first data buffer, respectively,
   wherein each of the address buffer and data are to be logically or physically partitioned into a plurality of partitions, wherein each partition of the address buffer is store address information generated by a select one of a plurality of cache agents and each partition of the data buffer is to store data generated by a select one of the plurality of cache agents.

2. The apparatus of claim 1 further comprising a first cache agent to generate a first address to be stored in the first address buffer entry and a first data to be stored in the first data buffer entry.

3. The apparatus of claim 2 further comprising merge logic to combine the first address and first data into a message to be transmitted to a target recipient.

4. The apparatus of claim 3 further comprising an arbiter to detect the storage of first data and first address within the first data buffer entry and the first address buffer entry, respectively, and to deallocate the first data buffer entry and the first address buffer entry.

5. The apparatus of claim 1, further comprising a second cache agent to transmit a second data and a second address to the data buffer and address buffer, respectively.

6. The apparatus of claim 5 wherein the first data and the second address is to be stored in the data buffer and address buffer, respectively, before the second data and the first address.

7. The apparatus of claim 6 wherein the first and second cache agents are interconnected via a data network to transmit the first and second data to the data buffer and the first and second cache agents are interconnected via an address network to transmit the first and second address to the buffer.

8. The apparatus of claim 1 wherein the LRU buffer allocation algorithm is to identify a least-recently de-allocated buffer entry within either or both of the address and data buffers.

9. A system comprising:
   a first processor including address allocation logic to allocate address entries among a first group of address buffer entries in an address buffer according to a first true least-recently-used (LRU) allocation algorithm independently of data entries to be allocated among a first group of data buffer entries in a data buffer according to a second LRU allocation algorithm;
a target recipient device to receive messages generated by the first processor,
wherein each of the address buffer and data are to be logically or physically partitioned into a plurality of partitions, wherein each partition of the address buffer is to store address information generated by a select one of a plurality of agents and each partition of the data buffer is to store data generated by a select one of the plurality of agents.

10. The system of claim 9 wherein the messages comprise a first address and a first data, for which the address buffer entries and data buffer entries are to be allocated by the address allocation logic and the data allocation logic, respectively.

11. The system of claim 10 wherein the first group of address buffer entries and the first group of data buffer entries correspond to a first cache agent to generate the first address and first data.

12. The system of claim 11 wherein the first group of address buffer entries and the first group of data buffer entries each comprise three entries.

13. The system of claim 9 further comprising a coherence ordered first-in-first-out (FIFO) buffer coupled to the address buffer to store addresses.

14. The system of claim 13 further comprising dependency resolution logic to resolve dependencies among addresses before they are stored, if at all, in the address buffer entries.

15. The system of claim 9 further comprising arbitration logic to deallocate the address buffer entries and the data buffer entries.

16. The system of claim 9 further comprising a plurality of cache agents, at least one of which is to store address and data within the first group of address buffer entries and the first group of data buffer entries, respectively.

17. A method comprising:
generating a plurality of addresses and data;
allocating entries within an address buffer according to a true least-recently-used (LRU) allocation algorithm to cause a least-recently de-allocated address buffer entry to be allocated;
allocating entries within a data buffer according to the true LRU allocation algorithm to cause a least-recently de-allocation data buffer entry to be allocated;
merging at least one of the plurality of data with at least one of the plurality of addresses into at least one of a plurality of messages;
wherein each of the address buffer and data are to be logically or physically partitioned into a plurality of partitions, wherein each partition of the address buffer is to store address information generated by a select one of a plurality of cache agents and each partition of the data buffer is to store generated by a select one of the plurality of cache agents.

18. The method of claim 17 further comprising transmitting the plurality of messages to a plurality of target recipients corresponding to the plurality of addresses.

19. The method of claim 18 further comprising detecting the storage of the plurality of addresses and plurality of data within the address buffer and data buffer, respectively.

20. The method of claim 19 further comprising resolving dependencies among the plurality of addresses before storing the plurality of addresses within the address buffer, wherein resolving dependencies includes reordering the plurality of addresses until a coherence protocol allows the plurality of addresses to be forwarded to the address buffer, if at all.

21. The method of claim 20 wherein the plurality of addresses and plurality of data are to be generated asynchronously with each other.

22. The method of claim 17 wherein the LRU allocation algorithm is to be performed using hardware logic.

23. The method of claim 17 wherein the LRU allocation logic is to be performed using a combination of hardware logic and software.

24. The method of claim 17 wherein the LRU allocation algorithm is to be performed within a multi-core processor.

25. A processor comprising:
an address allocation logic to allocate least-recently de-allocated address buffer entries in an address buffer in order to store a plurality of addresses;
a data allocation logic to allocate least-recently de-allocated data buffer entries in a data buffer in order to store a plurality of data;
an arbitration logic to de-allocate the least-recently used address buffer entries and the least-recently used data buffer entries and update least-recently-used state information in the address allocation logic and the data allocation logic;
merge logic to combine the plurality of addresses and the plurality of data into a plurality of messages;
a plurality of cache agents, at least one of which is to generate the plurality of addresses and the plurality of data to be stored in the address buffer entries and the data buffer entries, respectively,
wherein each of the address buffer and data are to be logically or physically partitioned into a plurality of partitions, wherein each partition of the address buffer is to store address information generated by a select one of the plurality of cache agents and each partition of the data buffer is to store data generated by a select one of the plurality of cache agents.

26. The processor of claim 25 wherein the plurality of cache agents are coupled together via a data network to transmit the plurality of data and the plurality of cache agents are coupled together via an address network to transmit the plurality of addresses.

27. The processor of claim 26 wherein the address allocation logic and the data allocation logic are to perform a true least-recently-used (LRU) algorithm to allocate the least-recently de-allocated address buffer entries and data buffer entries, respectively.

28. The processor of claim 25 further comprising a coherence ordered buffer to store the plurality of addresses before they are stored to the plurality of address buffer entries.

29. The processor of claim 25 further comprising a dependency resolution logic to resolve dependencies among the plurality of addresses before they are stored to the plurality of address buffer entries.

30. The processor of claim 25 further comprising a plurality of processing cores coupled to the plurality of cache agents.

* * * * *